Jan. 30, 1951    T. H. CLARK    2,539,402
RADIO DIRECTION FINDER
Filed Jan. 3, 1946
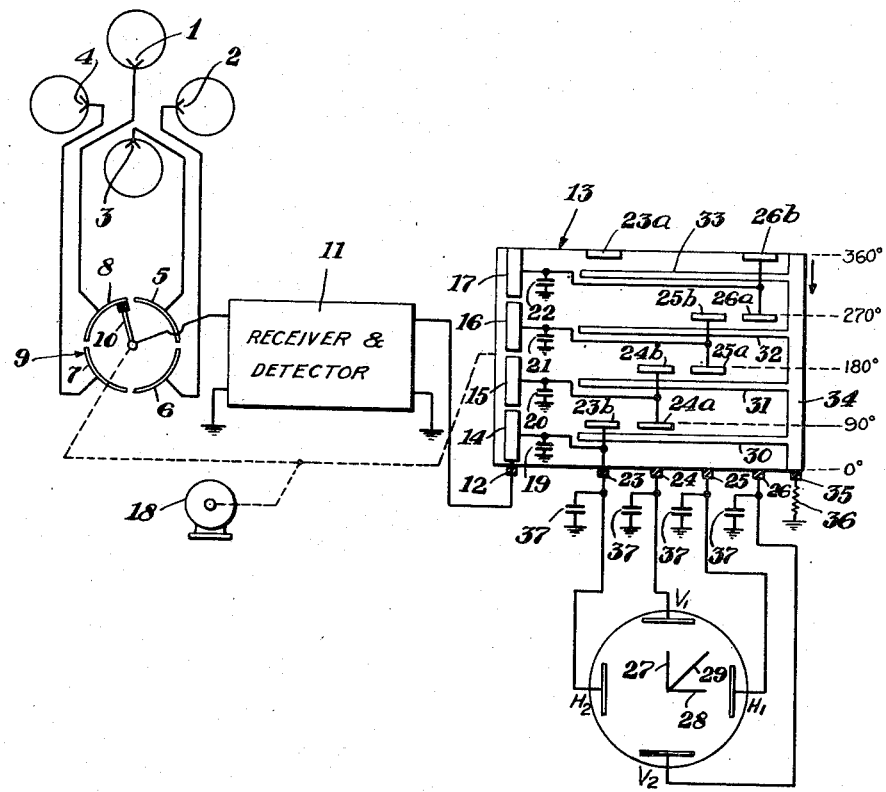
INVENTOR.
TREVOR H. CLARK
BY
*R. P. Morris*
ATTORNEY Patented Jan. 30, 1951

2,539,402

UNITED STATES PATENT OFFICE 2,539,402

RADIO DIRECTION FINDER

Trevor H. Clark, Boonton, N. J., assignor to Federal Telephone and Radio Corporation, New York, N. Y., a corporation of Delaware Application January 3, 1946, Serial No. 638,778

6 Claims. (Cl. 343—120)

My invention relates to radio direction finders, particularly to the type which visually and graphically indicates the direction from which radiant energy is received.

Many direction finder systems employing a cathode ray tube as an indicating instrument show a complex diagram such as an antenna directivity pattern, which can be interpreted only by a skilled operator. The ideal visual signal on the cathode ray screen would be a straight line whose inclination or angular displacement with respect to a fixed line or lines would be a measure of the angle of the received wave from a null or reference line.

Accordingly, the object of my invention is a radio direction finder that will visually indicate directions which can be easily interpreted.

A more specific object of my invention is a radio direction finder with a cathode ray tube indicator which will show on the screen at least two lines, the relative angular positions of which is proportional to the inclination of the received wave to a fixed reference line.

Preferred embodiments of my novel direction finder are described in the following specification and are shown in the accompanying drawing in which the single figure shows diagrammatically the circuits of one arrangement of my invention, with a developed view of one commutator switch for the circuits.

My novel radio direction finder comprises, essentially, means for continuously and successively sampling the field strength at all points of the compass, as with four differently oriented directional antenna. By means of a commutator or goniometer, the signal of each antenna is successively fed to a radio receiver and detected. The detected signals are then stored in condensers from which they are successively distributed to the deflecting plates or coils of a cathode ray tube.

Specific circuit connections of one embodiment of my invention particularly adapted for short wave operation is shown in Fig. 1. The four directional antennas 1, 2, 3 and 4, such as pick-up rods at the center of reflectors, are directed in four azimuthal right-angle directions. Each antenna is directly connected to one of the segments 5, 6, 7 and 8 of commutator 9, the wiper 10 of which is connected directly to the input circuit of the radio frequency receiver 11. The receiver is of conventional construction, having R. F. amplifiers and a detector, for deriving a direct current proportional to the applied carrier. The D. C. output of the receiver is connected to the brush or wiper 12 on commutator drum 13. Segments 14, 15, 16 and 17, associated with the brush 12, and other switch mechanism on the circumference of drum 13 to be described, may for convenience of this disclosure, be developed so that the entire 360 degrees of the drum surface may be seen in plan view. Commutators 9 and drum 13 are driven at the same speed by the motor 18 and the space phase of the two wipers 10 and 12 with respect to their segments are preferably the same so that each antenna is connected, through the receiver, to one segment 14, 15, 16 or 17 throughout the entire contact time of the wiper 12 with each segment. Storage condensers 19, 20, 21 and 22 are connected, respectively, between segments 14—17 and ground to hold charges representative of the field strengths of the several antennas.

The signals stored by the condensers are delivered to the deflection plates of a cathode ray tube by a novel switch now to be described. Four brushes 23, 24, 25 and 26, connected to the four deflection plates V1, H1, V2 and H2, are spaced lengthwise of the drum and are arranged in a straight line parallel to the drum axis. Segments 23a, 23b and 24a, 24b and 25a, 25b and 26a, 26b are arranged in pairs on the drum, the pairs of segments being axially and circumferentially spaced on the drum so that the pairs successively pass under the line of brushes.

According to an important feature of my invention, coordinate or reference lines 27 and 28 appear on the cathode ray screen to accurately orient and place, for the observer, a line 29 indicating the radio bearing. Each segment of each pair of segments is axially aligned on the drum with, or "overlaps," the segments of adjacent pairs, and simultaneously pass on to adjacent deflection plates the voltages from the two antennas affected by the received radio wave to trace line 29, and in addition the segments successively apply to the deflection plates, during each drum revolution, the individual deflection voltages of the antenna to trace lines 27 and 28. To return the cathode ray spot to the center of the screen after each excursion, means are provided for grounding the deflection plates between applications of deflecting voltages. Grounding bars 30, 31, 32 and 33 extend axially of the drum surface and are each connected at one end to slip ring 34, the slip ring being connected to ground through brush 35 and resistor 36. Each grounding bar is relatively close to its associated segments so that the brushes 23—26 are connected to ground just before the deflection voltage is applied to the cathode ray plate. A second set of four condensers 37 are connected between the deflection plates and ground, the values of these condensers and resistor 36 being so adjusted the spot will reach the center of the screen just before the succeeding deflection voltage is applied.

In operation, assume a radio wave is received on a line midway between antenna 1 and 2, corresponding to a 45 degree bearing, and energization of condensers 20 and 21, the remaining condensers remaining uncharged and inactive. Further assume a direction of rotation of the drum that moves the developed layout of Fig. 1 from top to bottom. All the brushes 23—26 are first grounded through the grounding bar 30, slip ring 34, brush 35 and resistor 36, and the cathode ray spot remains stationary in the center of the screen. Brush 24, connected to plate V1 then contacts segment 24a and the spot moves vertically straight toward plate V1. The spot returns slowly and as the brushes are again grounded, now by bar 31, the spot is again centered on the screen. Then brushes 24 and 25 simultaneously contact segments 24b and 25a, and assuming equal charges on condensers 20 and 21, the spot moves from center on a line 45 degrees with the ordinates of plates H1 and V2. Of course, any other proportion of charges on condensers 20 and 21 will produce a different inclination of the line of light. Finally, the spot returns along the 45 degree line and is centered, by grounding bar 32, whereupon segment 25b, through brush 25, deflects the spot straight toward plate H1, and connected condenser 37 permits the spot to return slowly to center. This sequence of operation repeats for each revolution of the drum, no change being indicated until the field strength at the antennas change.

In the example described, no deflections of the spot toward plates V2 or H2 will be seen except those which may be caused by extraneous noise voltages, such as static. The noise voltages are usually non-directional and effect the antennas equally in which case the deflection voltages on V2 and H2 merely cause the ordinate lines of Fig. 1 to spread. The relative position of the bearing line between the ordinates, however, remains unchanged so that the observer can always see the true bearing.

My novel direction finder gives a visual indication of direction on a cathode ray screen that is easily interpreted, a reference line being also shown so that the true bearing can be accurately determined.

I claim:

1. A radio direction finder and indicator comprising a plurality of antennas having adjoining overlapping directivity patterns, means for successively receiving and detecting the signal on each antenna, separate means for capacitively storing each signal, a cathode ray tube having a plurality of beam deflecting means, and means for sequentially selecting the stored signals corresponding to adjoining patterns, and means for applying said selected stored signals to separate deflecting means of said cathode ray tube.

2. A radio direction finder and indicator comprising a plurality of differently directional antennas having adjoining overlapping directivity patterns, means for successively receiving and detecting the signal on each antenna, a plurality of condensers for separately storing each of said detected signals, a cathode ray tube having a plurality of deflection elements, and means for sequentially selecting the stored signals corresponding to adjoining patterns, and means for applying each of said selected stored signals to a different one of said elements.

3. A direction finder comprising, a plurality of differently directed directional antennas having adjoining overlapping directivity patterns, a receiver, switch means for successively connecting said antennas to the input of said receiver, a plurality of condensers, switch means for successively connecting said condensers to the output of said receiver, a cathode ray tube with a plurality of beam deflection means, and switch means for selecting in a given sequence condensers corresponding to the antennas having adjoining overlapping directivity patterns for coupling each of the selected condensers to separate deflection means, the first, second and third mentioned switch means being mechanically interlocked.

4. A direction finder comprising, a plurality of condensers, means for separately charging said condensers, respectively, to values proportional to radio field strengths in different directions, a commutator having a plurality of brushes and a plurality of pairs of segments, connections between each of said condensers and a respective pair of segments, one segment of one pair of segments corresponding to a given direction being aligned with one segment of another pair of segments corresponding to a direction adjoining said given direction, means for sequentially selecting a pair of aligned segments comprising respective pairs of said brushes, and means for comparing the condenser charge developed at said brushes.

5. The direction finder defined in claim 4, further comprising grounding bars on said commutator, constructed and arranged to contact and connect to ground potential each brush before said brush contacts said segments.

6. The method of direction finding comprising successively receiving and detecting radio signals from different directions, separately storing each detected signal, sequentially selecting the individual stored signals corresponding to given adjoining directions, and visually indicating the relative values of the selected signals.

TREVOR H. CLARK.

REFERENCES CITED

The following references are of record in the file of this patent:

UNITED STATES PATENTS

| Number | Name | Date |
|---|---|---|
| 2,284,475 | Plebanski | May 26, 1942 |
| 2,392,420 | Steinhoff | Jan. 8, 1946 |
| 2,400,641 | Hardy | May 21, 1946 |
| 2,412,682 | Hershberger | Dec. 17, 1946 |
| 2,412,702 | Wolff | Dec. 17, 1946 |
| 2,413,981 | Luck | Jan. 7, 1947 |
| 2,415,566 | Rhea | Feb. 11, 1947 |

FOREIGN PATENTS

| Number | Country | Date |
|---|---|---|
| 873,067 | France | Mar. 2, 1942 |